Patented July 18, 1944

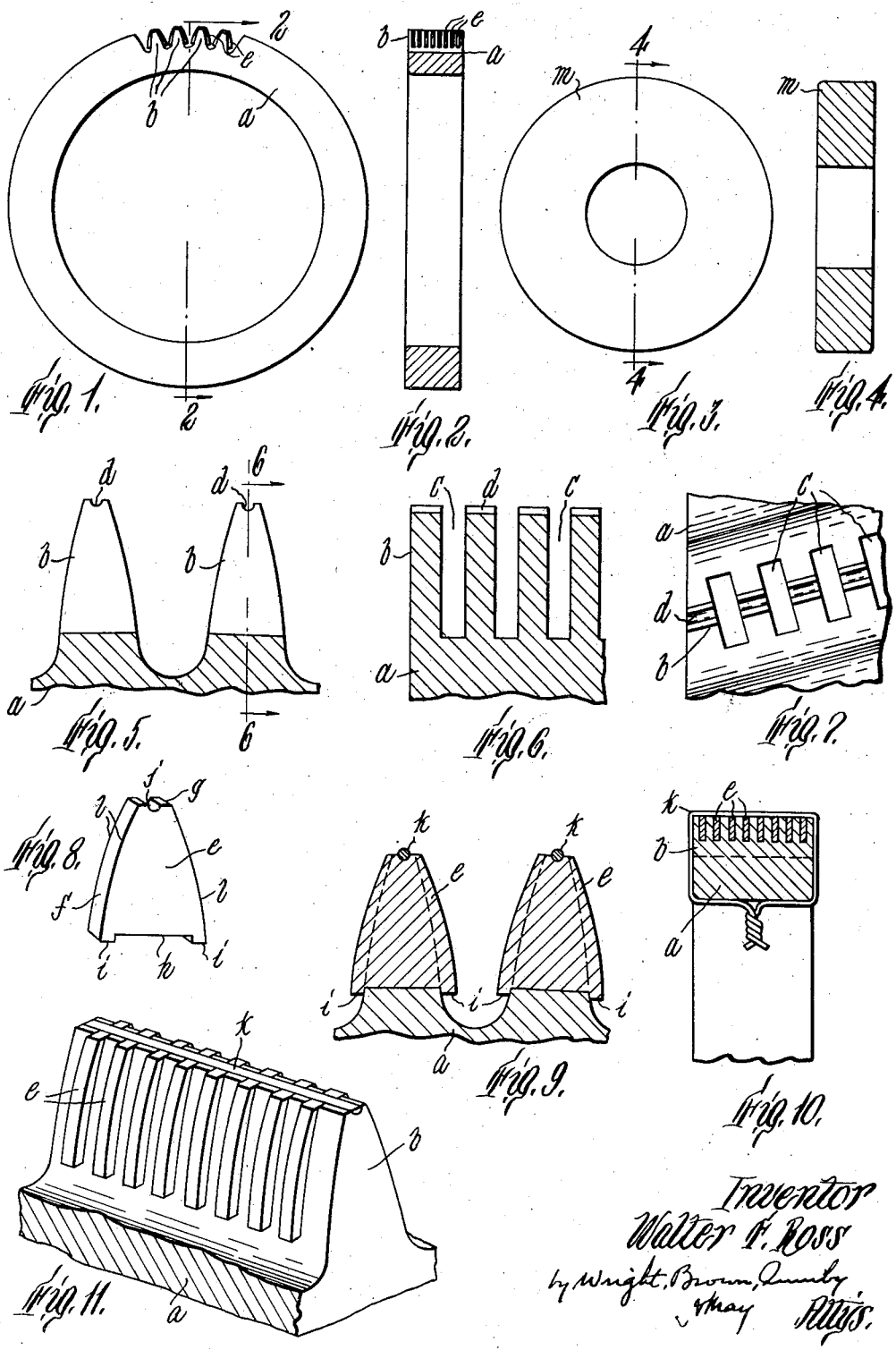

2,354,144

UNITED STATES PATENT OFFICE 2,354,144

SHAVING TOOL WITH INSERTED CUTTING BLADES AND METHOD OF MAKING SAME

Walter F. Ross, Springfield, Vt., assignor to The Fellows Gear Shaper Company, Springfield, Vt., a corporation of Vermont Application January 11, 1941, Serial No. 374,097

11 Claims. (Cl. 76—101)

The object of the present invention is to furnish tools or cutters adapted to finish gears by shaving and having improved cutting qualities, greater resistance to deterioration of the cutting edges by continued use, and substantial uniformity as regards cutting qualities and longevity among different cutters made of the same materials in the same way.

Tools of the class herein identified are provided with teeth conjugate to the teeth of the gears which they are designed to finish, and in the sides of which are alternate grooves and lands, extending from the crests toward the roots of the teeth. The intersections between the outer faces of the lands are sharp edges adapted to cut with a scraping effect, and usually a comparatively large number of such edges are provided between the ends of the teeth in both side faces. The teeth of such tools may be either external or internal and either parallel to the axis or helical. When such tool is run in mesh with a gear to be finished, and a relative slip between meshing teeth is caused to take place lengthwise of such teeth, with exertion of substantial pressure between the faces of the teeth in contact, the cutting edges referred to perform a scraping action on the faces of the work gear teeth, removing metal in minute chips and rapidly reducing the work gear teeth to predetermined face form and width dimensions.

Heretofore those parts of the teeth which contain or carry the cutting edges have been integral with the substance of the teeth themselves. This has necessitated making the entire mass of the teeth and at least the contiguous tooth bearing zone of the tool, if not the entire tool, of a metal composition, such as high speed steel, which is sufficiently hard to provide edges capable of cutting the metals of which gears are made. Also the preferred method of producing such tools with adequate strength in the cutting portions of the teeth has necessitated forming the grooves by a slow and expensive slotting procedure.

In accordance with the present invention I have provided as the edged cutting portions separate inserted blades of suitable metal cutting material which are placed in slots cut entirely through the substance of the teeth and are secured immovably in such slots in a manner which causes them to support, and be supported by, the integral substance of the teeth with sufficient strength and rigidity to enable them to be ground to prescribed outlines and to perform their prescribed cutting functions on gear teeth. The invention comprises a tool so constructed, and also comprises a method of mounting the inserts in the tool teeth and uniting them to the substance of the teeth. The principles of the invention are set forth in the following specification with reference to drawing which illustrates one of the several forms in which the invention may be embodied.

Referring to the drawing,

Fig. 1 is an end view of the tooth bearing portion of an externally toothed tool embodying the invention, such portion being a ring adapted to be mounted on a core or hub;

Fig. 2 is an axial section of the ring taken on line 2—2 of Fig. 1;

Fig. 3 is an end view of the core or hub on which the ring shown in Figs. 1 and 2 is mounted;

Fig. 4 is a section of such hub taken on line 4—4 of Fig. 3;

Fig. 5 is a fragmentary section, shown on an enlarged scale, of the tooth bearing portion of the tool and including two teeth, taken on a plane through transverse slots in such teeth;

Fig. 6 is a section taken on line 6—6 of Fig. 5;

Fig. 7 is a top plan view of a tooth like one of those shown in Fig. 5 illustrating the application of the invention to tools having helical teeth;

Fig. 8 is a perspective view of one of the blades or inserts which are combined with teeth of the character shown in Figs. 5, 6 and 7 to provide the cutting edges;

Fig. 9 is a view similar to Fig. 5 but showing blades like that of Fig. 8 mounted in such teeth;

Fig. 10 is an axial section of one side of the tooth bearing ring illustrating a step in the method of mounting and securing the blades in the teeth;

Fig. 11 is a perspective view on a large scale of one of the finished teeth with the inserted blades permanently secured in position.

Like reference characters designate the same parts wherever they occur in all the figures.

The tooth bearing part of the tool here illustrated is a ring $a$ of any material having suitable strength and stiffness for the purpose in view. It may, for instance, be made of steel which is easily worked by metal cutting tools and is at the same time sufficiently tough and hard to support its teeth without liability of breakage under heavy pressures and hard shocks. Teeth $b$ are cut in its circumference with a pitch spacing conformable to that of the gears which it is designed to finish, but with a thickness or width circumferentially considerably less than necessary to mesh with the teeth of such gears. The side faces of the teeth b may have any curvature in planes perpendicular to the axis of the tool, or they may be straight in such planes; but it is preferable to give them a convex curvature more or less nearly similar to that of the cutting edges. Slots c are cut through the teeth b from the crests toward the roots thereof a sufficient distance to receive and support adequately inserted blades of suitable height, and in the correct positions, to finish gear teeth after repeated sharpenings. In the crest of each tooth a longitudinal groove d is cut. The grooves are preferably, although not necessarily, of semi-circular section and located midway between the bounding edges of the tooth crests.

Blades e are provided for placement in the slots c of the teeth. Such blades are of hard material capable of cutting metal and of resisting wear at their cutting edges. Materials such as carboloy, high speed steel, or any other known or suitable hard cutting material may be used for this purpose. The blades are initially formed with contours at their side boundaries or faces f approximating curves conjugate to the tooth faces of the gears to be finished, but have excess width sufficient to permit bringing such faces by finish grinding to the exact required form and correct spacing from other teeth. The height of the blade from tip g to base h is equal, with a slight tolerance, to the depth of the slots c. Shoulders i extend downward from the base h in extension, at their outer surfaces, with the bounding faces f of the blade, and with their inner boundaries spaced apart a distance approximately equal to the thickness of the teeth b at the base of the slots, but with enough excess to permit placement in embracing relation with the tooth root portions, as shown in Fig. 9. The end faces of the blade are plane and parallel, and the thickness of material between them is enough less than the width of the slots c to permit flow of hard soldering compound between them and the walls of the slots when heated to a brazing temperature. In the tip of the blade there is a groove j corresponding to the grooves d in the tooth crests.

The blades thus described are placed in the tooth slots c, one in every slot of every tooth. They are permanently secured by brazing or other suitable hard soldering or welding method. But before being so secured, they are anchored in place by a wire k laid in the registering grooves d and j of the teeth and blades, bent around the substance of the ring c, substantially as illustrated in Fig. 10, and made fast in any suitable way. The shoulders i then embrace the root portions of the teeth b, forming locks which prevent dislodgment laterally of the base portions of the blade, while the wire holds the blade at its tip against displacement in any direction.

The operation of then uniting the blades by brazing may be carried out by any known method and means, the details of which are not material to the present invention. Or the permanent union may be effected in other suitable ways. This step of the invention embraces any suitable procedure and means for uniting the inserted blades to the tooth substance in such a way as to form a bond between their contiguous overlapping surfaces and make the blades practically integral parts of the teeth, so far as concerns any possibility of becoming displaced in service and under the unavoidable shocks of handling. Hence, where the term "brazing" is used in this specification, and in the claims, it is to be understood as generically including any means of union suitable for the purpose, unless the context requires otherwise.

After the brazing operation the parts of the anchor wires k, except those occupying the grooves, are cut away and the ring is finished. In thus finishing the inserted blades, their side faces, which protrude from the sides of the teeth b, are ground to prescribed forms and dimensions, which may be done by means of a formed grinding wheel, or by generative grinding, and thereby sharp cutting edges are produced at the intersections l between their side and end faces. The outside circumference, end faces, and inside circumference of the ring are finished to prescribed dimensions.

Where, as in this illustration, the teeth are formed in a ring, such ring is subsequently placed on a hub or core m so as to surround the same and is secured thereto. This may be done by expanding the ring by heat and allowing it to shrink on the hub. Or various other means of connection may be used. It is not necessary, however, that the tool be of this two part ring and hub construction. The invention may equally well be embodied in a one piece tool having a central hole for mounting on a spindle, arbor or bushing.

The invention is not limited to tools with external teeth, but may equally well be embodied in annular tools having internal teeth, such as are illustrated in the patents of Edward W. Miller 2,228,965; 2,228,966; and 2,228,968; granted January 14, 1941.

Whether the tool is one with external teeth or internal teeth, such teeth may be either straight, i. e., of spur tooth character, or helical. The drawing, with the exception of Fig. 7, represents the teeth as being of spur character, but Fig. 7 shows a helical form of tooth. When of such form, the helix angle may be of any value which will serve for shaving gears. The transverse slots c in helical teeth are preferably normal to the tooth helices, as they are perpendicular to the length of spur teeth. But it is possible, and within my contemplation, to arrange the slots and blades otherwise than normal in case, for any reason, it is desired to make the angle between surfaces bounding any cutting edges an acute angle.

Conformably to the usual practice in respect to gear finishing cutters, the teeth here shown containing inserted blades are intentionally made with excess addenda to permit of making the blades with sufficient width so that they can be resharpened and reconditioned, by grinding, many times without destroying the usefulness of the tool. But the hardness of the blades and the uniformity in quality with which such blades may be made, enable the tool to be used for long periods and to operate on many hundreds of gears without dulling their edges enough to need resharpening.

This method of providing cutting edges in shaving tools permits the entire body of the tool and the main portions of the teeth to be made of metal which is relatively inexpensive in comparison to the hard metal provided for the blades, and those portions of the teeth may be made without particular attention to accuracy in any manner. Hence it is a very rapid and inexpensive means of making such tools. Its advantage in that particular with respect to fine pitch tools is particularly pronounced; although of course it is applicable to tools having teeth of any pitch.

What I claim and desire to secure by Letters Patent is:

1. A gear finishing tool consisting of a body having transversely slotted integral teeth, and separate blades located in the slots of said teeth and bonded to the contiguous substance of the teeth; said blades protruding from the side faces of the teeth and having lateral faces conjugate in form to the teeth of gears which the tool is designed to finish.

2. A gear finishing tool consisting of a body having teeth located and spaced apart in the manner of gear teeth, but of less than standard width, provided with transverse slots between their ends, and blades of hard metal-cutting material located in such slots and bonded to the embracing walls thereof; said blades protruding at both sides beyond the side faces of the teeth to which they are respectively bonded and having cutting edges at their outer boundaries.

3. A gear finishing tool consisting of a body having teeth located and spaced apart in the manner of gear teeth, but of less than standard width, provided with transverse slots between their ends, and blades of hard metal-cutting material located in such slots and bonded to the embracing walls thereof; said blades protruding at both sides beyond the side faces of the teeth to which they are respectively bonded and having cutting edges at their outer boundaries, such edges of all the blades of each tooth lying in curves conjugate to the teeth of gears which the tool is designed to finish.

4. A gear finishing tool consisting of a body having teeth located and spaced apart in the manner of gear teeth, but of less than standard width, provided with transverse slots between their ends, and blades of hard metal-cutting material located in such slots and bonded to the embracing walls thereof; said blades protruding at both sides beyond the side faces of the teeth to which they are respectively bonded and having cutting edges at their outer boundaries, all the protruding edges at the same side of any tooth lying in an involute surface generated with reference to the axis of the body.

5. A gear finishing tool consisting of a body of sufficiently tough and rigid material to support the after-mentioned blades, although not necessarily hard enough for gear cutting purposes, having teeth slotted through from side to side between their ends and from their crests toward their root portions, and blades of sufficiently hard material to cut the substance of steel gears located and permanently secured in the slots of said teeth, in bonded mutually-supporting connection with the walls of the slots, said blades protruding laterally from said teeth and having cutting edges at their outer boundaries.

6. A gear finishing tool provided with transversely slotted teeth arranged similarly to gear teeth, and blades of hard, metal-cutting material located in the slots of said teeth in firmly bonded union at their end faces with the walls of said slots, the sides of said blades protruding from the contiguous sides of the teeth in which they are respectively mounted and having cutting edges at their boundaries.

7. A gear finishing tool having teeth in an arrangement similar to the teeth of a gear, but of less than standard width, said teeth having slots between their ends extending from their crests toward their roots and from side to side, and blades of hard, metal-cutting substance located in said slots having lateral bounding edges protruding from the sides of the teeth and shoulders at their bases embracing the root portions of the teeth, the end faces of the blades being bonded solidly to the embracing walls of the slots.

8. The method of making an inserted-blade gear finishing tool which consists in cutting teeth in one boundary of a tool body having a central hole, slotting said teeth transversely between their ends from their crests toward their roots, grooving the crests of the teeth lengthwise, placing in the slots so made blades of greater width than the teeth so that the opposite side boundaries of the blades protrude laterally from the slots, passing and securing a binder around a tooth and the contiguous part of the body lengthwise of the tooth, in the crest groove thereof and across the inserted blades, to hold the blades in place prior to their permanent union, and then uniting the blades permanently to the flanking portions of the tooth substance by fused surface bonding.

9. The method of making an inserted-blade gear finishing tool which consists in providing a metal body having a central hole, cutting teeth in one of the circumferences of said body, cutting transverse slots in such teeth between their ends, providing blades of hard, metal-cutting substance having width greater than that of the teeth, thickness enough less than the width of the slots to pass into them, and base shoulders spaced apart sufficiently to embrace the root portions of the teeth contiguous to the bottoms of the slots, placing such blades in the slots with their shoulders embracing the tooth roots, passing and securing a binder wire lengthwise around the teeth across the inserted blades, and permanently bonding the blades to the contiguous substance of the teeth.

10. A gear finishing tool consisting of a generally cylindrical body having teeth spaced in a curved pitch line around the axis of said body with their length dimensions extending in the same general direction as the axis, said teeth having transverse slots extending entirely through them and located in planes transverse to said axis, and separate blades of hard metal-cutting material located in said slots in bonded union with the substance of the teeth between the slots and protruding at both sides beyond the side faces of the teeth in which they are respectively mounted, said blades having cutting edges at their lateral boundaries.

11. A gear finishing tool consisting of a generally cylindrical body having teeth spaced in a curved pitch line around the axis of said body with their length dimensions extending in the same general direction as the axis, said teeth having transverse slots extending entirely through them and located in planes transverse to said axis, and separate blades of hard metal-cutting material located in said slots in bonded union with the substance of the teeth between the slots and protruding at both sides beyond the side faces of the teeth in which they are respectively mounted, said blades having cutting edges at their lateral boundaries, all of such edges at the same side of any tooth being located in an involute surface generated with reference to said axis.

WALTER F. ROSS.